(12) United States Patent
Snyder

(10) Patent No.: US 6,871,897 B1
(45) Date of Patent: Mar. 29, 2005

(54) LOW PROFILE SLIDEOUT ASSEMBLY

(75) Inventor: Don Snyder, Battle Creek, MI (US)

(73) Assignee: Barker Manufacturing Co., Battle Creek, MI (US)

( * ) Notice: Subject to any disclaimer, the term of this patent is extended or adjusted under 35 U.S.C. 154(b) by 0 days.

(21) Appl. No.: 10/751,004

(22) Filed: Jan. 2, 2004

(51) Int. Cl.[7] .................................................. B60P 3/34
(52) U.S. Cl. ..................... 296/26.13; 296/165; 296/171; 296/175
(58) Field of Search ........................... 296/26.12, 26.13, 296/165, 171, 172, 175; 52/67

(56) References Cited

U.S. PATENT DOCUMENTS

| | | |
|---|---|---|
| 1,521,635 A | 1/1925 | Lewis |
| 2,842,972 A | 7/1958 | Houdart |
| 3,137,041 A | 6/1964 | Mullen |
| 3,819,077 A | 6/1974 | Rasmussen et al. |
| 3,874,244 A | 4/1975 | Rasmussen et al. |
| 4,133,571 A | 1/1979 | Fillios |
| 4,253,283 A | 3/1981 | May |
| 4,955,661 A | 9/1990 | Mattice |
| 5,092,650 A | 3/1992 | Perlot |
| 5,127,697 A | 7/1992 | St. Marie |
| 5,154,469 A | 10/1992 | Morrow |
| 5,237,782 A | 8/1993 | Cooper |
| 5,332,276 A | 7/1994 | Blodgett, Jr. |
| 5,333,420 A | 8/1994 | Eden |
| 5,491,933 A | 2/1996 | Miller et al. |
| 5,758,918 A | 6/1998 | Schneider et al. |
| 5,902,001 A * | 5/1999 | Schneider ................ 296/26.13 |
| 5,915,774 A | 6/1999 | Tiedge |
| 5,984,396 A * | 11/1999 | Schneider ................ 296/26.13 |
| 6,109,683 A | 8/2000 | Schneider |
| 6,116,671 A | 9/2000 | Schneider |
| 6,293,611 B1 | 9/2001 | Schneider et al. |
| 6,338,523 B1 | 1/2002 | Rasmussen |
| 6,494,518 B2 * | 12/2002 | Kreil et al. ............... 296/26.13 |
| 6,619,714 B2 | 9/2003 | Schneider et al. |
| 2002/0056329 A1 | 5/2002 | Rasmussen |
| 2002/0084664 A1 | 7/2002 | McManus et al. |
| 2003/0141732 A1 | 7/2003 | Nye et al. |

* cited by examiner

*Primary Examiner*—Lori L. Coletta
(74) *Attorney, Agent, or Firm*—Flynn, Thiel, Boutell & Tanis, P.C.

(57) ABSTRACT

A low-profile sideout drive mechanism includes a movable support rail for the sideout formed of an outer channel and a nested inner channel having a vertical height less than the outer channel. The inner and outer channels define a tubular rail or ram wherein the inner channel is formed with slots therein to define a gear rack wherein the vertical space requirements of the tubular rail and a cooperating drive gear are minimized.

15 Claims, 3 Drawing Sheets

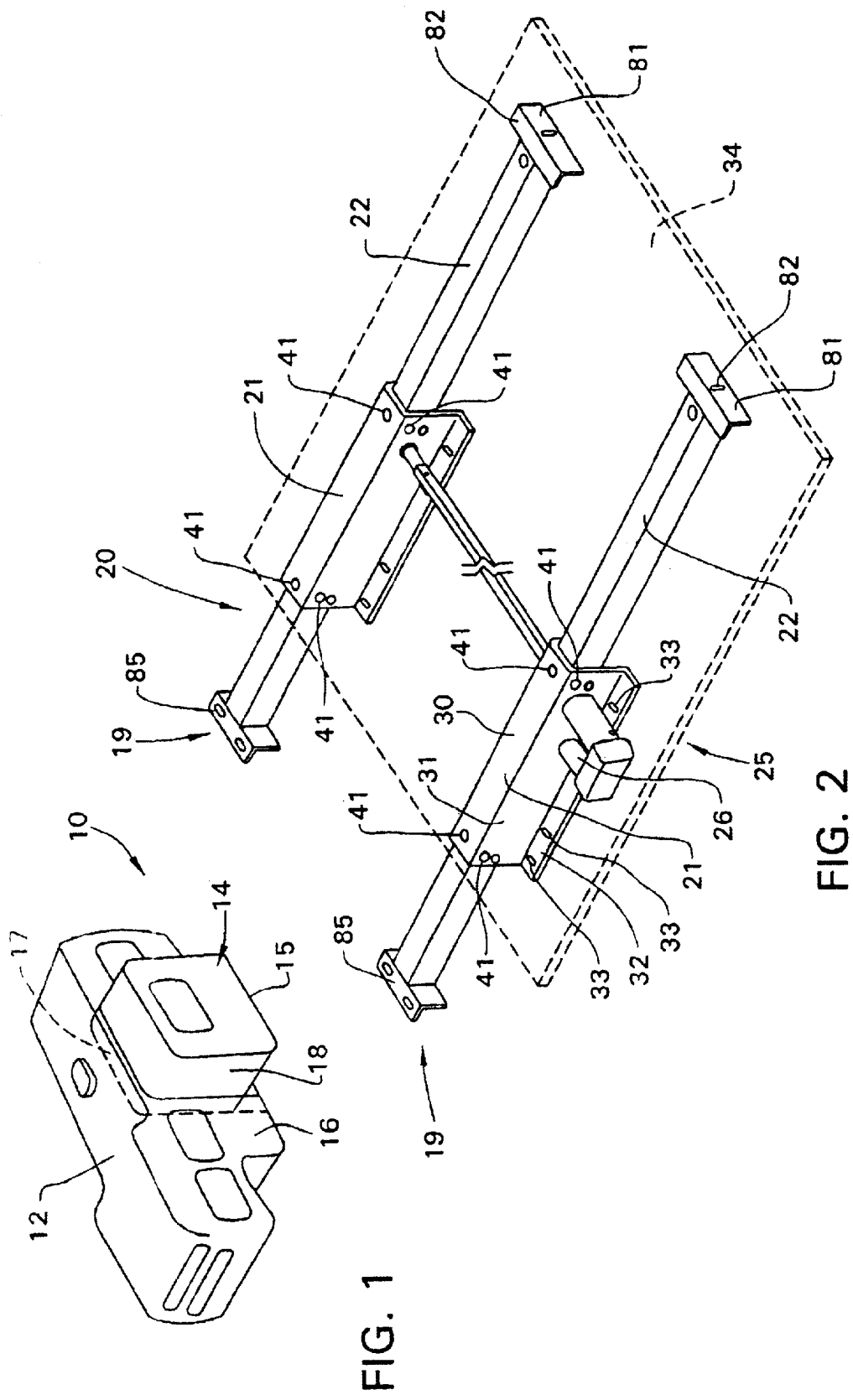

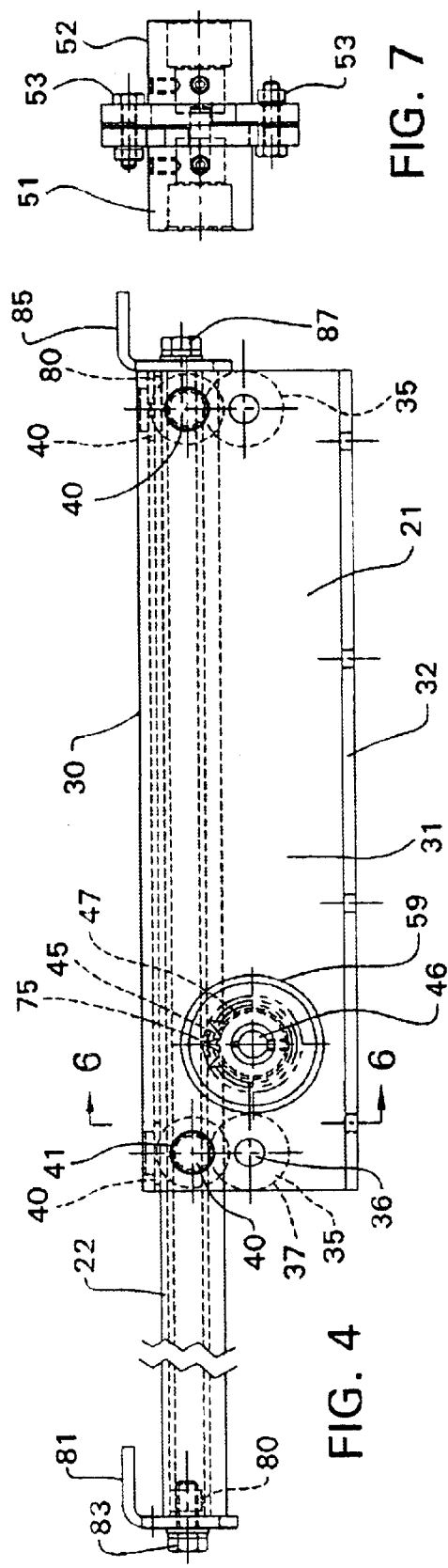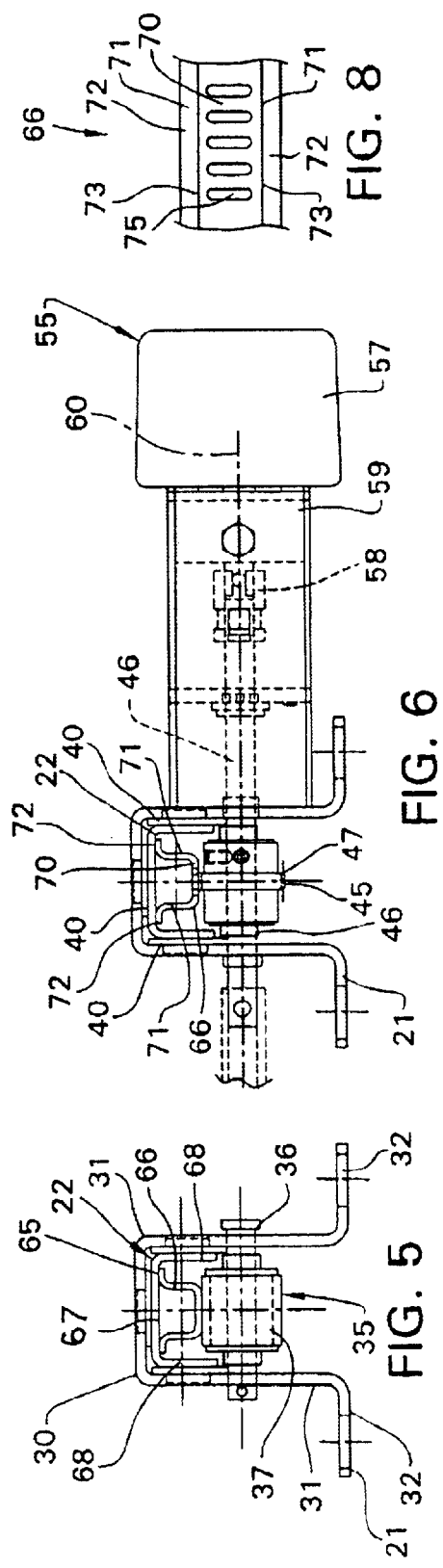

LOW PROFILE SLIDEOUT ASSEMBLY

FIELD OF THE INVENTION

The invention relates to a low-profile drive assembly for a camper sideout.

BACKGROUND OF THE INVENTION

Conventional recreational vehicles, such as travel trailers have a main vehicle body, wherein pop-up type trailers often include slide out beds at the opposite ends. The main body provides a primary living area while the beds extend out in cantilevered relation therewith to define sleeping areas. Alternatively, many trailers have fixed full-height sidewalls and do not require pullout beds.

Many such trailers, whether pop-up or fixed wall, include sideouts which are slide out living sections which are supported on the side of the main body and extend outwardly therefrom to provide expanded living space. The sideouts expand for use and retract inwardly into and are stored within the area of the main body such as for transport.

Such beds and sideouts use various conventional telescoping drive assemblies to support and control extension/retraction of the beds and sideouts. Generally, the drive mechanisms including an arrangement of telescoping, rigid rails assemblies which comprise a stationary rail mounted on the main body and a movable rail, typically nested in the stationary rail, which said movable rail is attached to the respective bed or sideout and slides horizontally therewith. A drive arrangement is connected to the movable rail to control the movement of the rail and thereby control retraction or extension of the beds or sideouts.

While many configurations of cooperating, telescoping rails have been used in known drive mechanisms, it is an object of the invention to provide an improved drive mechanism, which provides advantages over prior systems.

The invention relates to a telescoping drive mechanism for slide out sections of recreational vehicles which drive mechanism has a low-profile to minimize the height of the vertical space required to mount the drive mechanism between the main trailer body and the slide out section. This low-profile mechanism is particularly advantageous for sideouts for which the height requirement is important. For beds, the telescoping rails extend parallel to and may be incorporated into the sidewalls of the main body and thereby straddle the living area which therefore provides greater flexibility in the vertical dimension. However, the sideouts typically extend sidewardly or perpendicularly from a middle portion of the sidewall such that the telescoping rails must be hidden within the interior living space.

The low profile drive mechanism uses a rail assembly having a low profile. Rather than use square tubing which has a fixed vertical dimension, the movable rail or ram is formed of an outer U-shaped channel with an inner C-channel welded within the interior slot of the outer channel. The inner channel rigidities the outer channel and essentially defines a tubular rail but has a shorter vertical dimension than the outer channel so that the thickness between the bottom and top tube walls is less than the vertical height of the outer channel sidewalls.

Further, the wall of the inner channel is stamped with a pattern of horizontally spaced apart slots which define a gear rack that is drivingly engaged with a rotating drive gear. The drive gear thereby drives the movable rail. Due to the reduced height of the inner channel, the drive gear projects upwardly into the outer channel with the overall vertical height requirements of the combined gear and movable rail being less than known rail arrangements. Furthermore, the inner rail is easier to manufacture than a machined gear rack of conventional construction.

Other objects and purposes of the invention, and variations thereof, will be apparent upon reading the following specification and inspecting the accompanying drawings.

BRIEF DESCRIPTION OF THE DRAWINGS

FIG. 1 is perspective view of a travel trailer with a retractable sideout in an extended position.

FIG. 2 is a perspective view of a sideout drive mechanism.

FIG. 4 is a side view of the drive mechanism.

FIG. 5 is an end view of a rail assembly for the drive mechanism.

FIG. 6 is an end cross-sectional view of the rail assembly as taken along line 6—6 of FIG. 5.

FIG. 7 is a partial view of a connector bracket for a coupler shaft.

FIG. 8 is an enlarged partial bottom view of an inner channel of the movable rail or ram.

Figure 3:
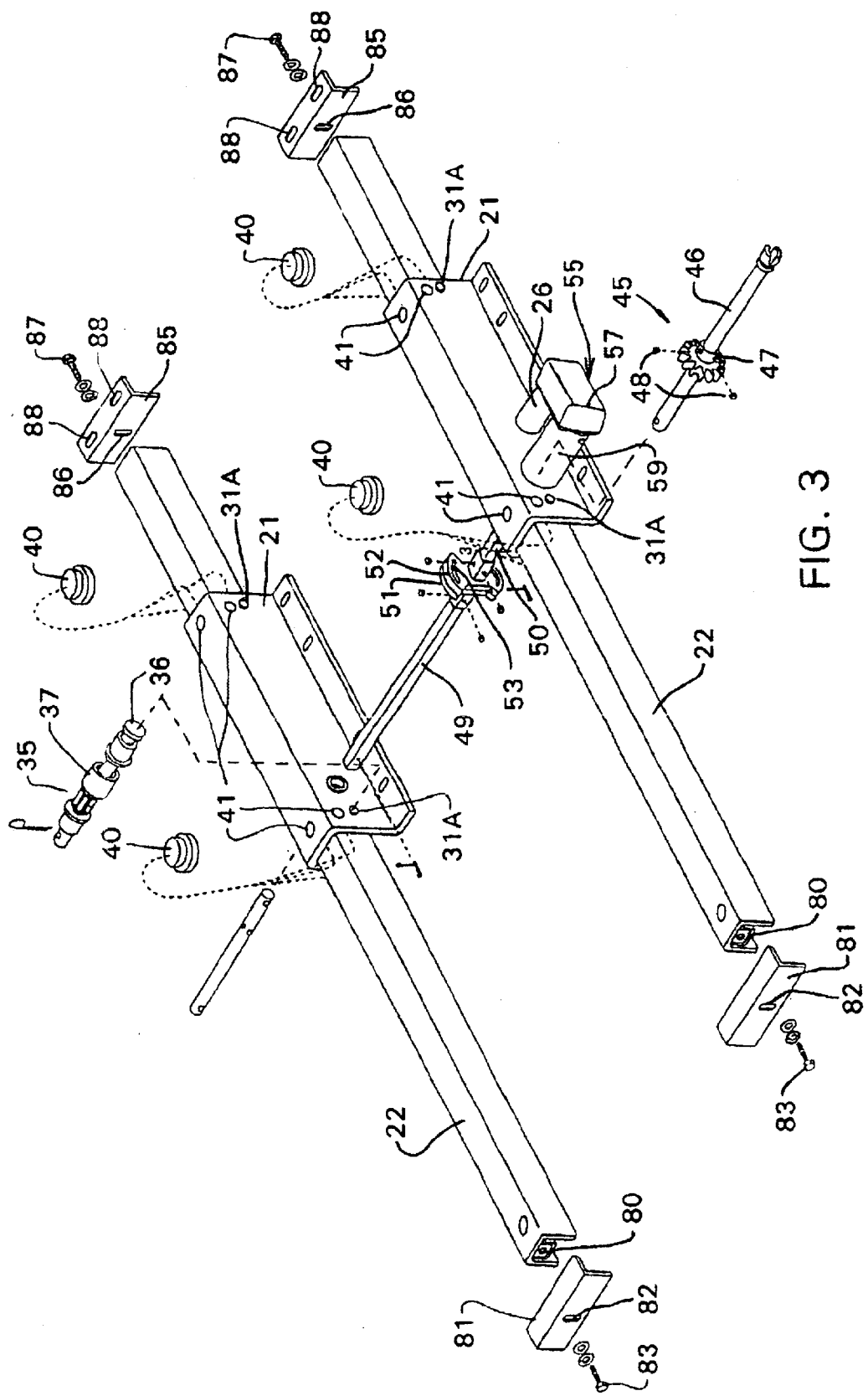
FIG. 3 is an exploded view of the drive mechanism.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the system and designated parts thereof. Said terminology will include the words specifically mentioned, derivatives thereof, and words of similar import.

DETAILED DESCRIPTION

Referring to FIG. 1, a recreational vehicle 10 is illustrated of the fixed wall type of trailer, which trailer is defined by a main body 12 on which is supported an auxiliary living section 14.

The auxiliary living section 14 is a sideout 15 that is supported in cantilevered relation on the sidewall 16 of the main body 12. The sideout 15 has an inner end portion 17 which remains engaged with the main body 12 and an outer exposed portion 18 which is adapted to project outwardly from the main body 12 when in use to expand the living area defined by the main body 12. The sideout 15 also retracts to a storage position enclosed within the main body 12 to permit transport.

To vertically support the sideout 15 and control its extension and retraction, a telescoping drive mechanism 20 (FIG. 2) is provided which supports the sideout 15 on the main body 12. The drive mechanism 20 comprises a pair of ram assemblies 19 that each comprise a stationary rail 21 which mounts rigidly on the main trailer body 12 and a movable rail or ram 22 which is fastened to the sideout 15 such that the sideout 15 and attached movable rails 22 move together in unison during extension and retraction of the sideout 15. The movable rail 22 is slidably engaged with the stationary rail 21 so as to be configured for horizontal, telescoping movement relative thereto.

The drive mechanism 20 further includes a gear drive assembly 25 which includes a drive motor 26 that effects controlled rotation of a gear arrangement to drive the rams 22 inwardly and outwardly.

More in detail as to the stationary rail 21, this rail 21 has a downward-opening U-shape defined by an upper wall 30, two depending sidewalls 31 and bottom mounting flanges 32 extending sidewardly from the sidewalls 31. The flanges 32 include fastener holes 33 through which fasteners are engaged to affix the rail 21 on a support panel 34 (FIG. 2) of the main body 12. As such, the stationary rails 21 are laterally spaced apart and rigidly supported on the main body 12 to carry the weight of the sideout 15.

Referring to FIGS. 4 and 5, the rail sidewalls 31 support a pair of bearing roller units 35 at the opposite inboard and outboard ends of the rail 21. Each roller unit 35 comprises an axle 36, which is supported by aligned support holes 31A and spans the sidewalls 31, and a cylindrical roller 37, which is adapted to rotatably support the movable rail 22 on the top thereof. The roller units 35 thereby define support members on which the respective movable rail 22 is supported vertically while still being horizontally slidable.

To also support and guide the sides and top of the movable rail or ram 22, each stationary rail 21 has a set of three low-friction bearing pads 40 at each opposite end. The pads 40 are diagrammatically illustrated as being fitted into the pad mounting holes 41 formed in both sidewalls 31 and the top wall 30. The pads 40 thereby restrain the movable rail 22 sidewardly and vertically and provide low-friction surfaces upon which the rail 22 may slide.

Each stationary rail 21 also includes a drive gear 45 rotatably supported thereon. Each drive gear 45 has a rotatable gear shaft 46 with a radially projecting gear section 47 formed like a sprocket which is affixed to the shaft 46 by fasteners 48 (FIG. 3). The leftward drive gear of FIG. 3 has a shorter gear shaft 46 but the gear shaft 46 for each gear 45 projects out of the rails 21 and are rotatably joined together by sections of square drive shaft 49 and 50 (FIGS. 3 and 7). The square shafts 49 and 50 have coupler flanges 51 and 52 which are joined together by fasteners 53 during assembly such that the gears 45 rotate together in unison so as to drive both movable rails 22 simultaneously.

To drive the gears 45, a power head 55 is mounted on the right rail 21 (FIG. 3). The power head 55 comprises the drive motor 26 which drives a gear arrangement within a gear housing 57, which gear arrangement drives the rightward gear shaft 46 through a coupling 58 within a shaft cover 59. The drive arrangement also includes a brake (not illustrated) which engages one of the shafts of the arrangement to normally brake the system when the motor is off.

The shaft 46 rotates about a horizontal shaft axis 60, which shaft axis 60 is spaced vertically above the mounting flanges 32. The vertical elevation of the axis 60 essentially is defined by the height of the power head 55 as seen in FIG. 6, whereby the additional vertical height to the top rail wall 30 defines the vertical space requirement for use of the drive mechanism 20. As referenced previously, it is desirable to minimize the vertical height of the drive mechanism 20, namely, the vertical height of the rail 21, to thereby provide a low profile for the drive mechanism 21. This is accomplished with the present invention as further described herein. While a low profile is provided, the drive mechanism 20 still provides the requisite strength to support the weight and operational loads of the sideout 15.

Referring to FIGS. 5 and 6, the movable rail or ram 22 is formed of two nested channels comprising an outer U-shaped channel 65 and an inner U-shaped channel 66 wherein the channels 65 and 66 open toward each other in opposite vertical directions. The outer channel 65 is defined by a top wall 67 having depending sidewalls 68 which project downwardly and define a longitudinal slot along the length of the rail 22 which opens downwardly. When the rail 22 is fitted within the stationary rail 21, the top and side walls 68 are slidably supported by the bearing pads 40. The sidewalls 6B further project downwardly below the level of the bearing roller 37 due to the lateral clearance spaces defined between the roller 37 and the opposing inside faces of the rail sidewalls 31. The outer channel 65 thereby has a vertical dimension which is greater than the vertical space defined between the roller 37 and the top bearing pad 40 since the sidewalls 68 straddle the roller 37.

As to the inner channel 66, this channel 66 is smaller both laterally and vertically than the outer channel 65 so as to fit within the slot of the outer channel 65. The inner channel 66, however, has the same longitudinal length as the outer channel 54.

The inner channel 66 includes a bottom wall 70 from which a pair of side walls 71 project vertically. The upper ends of the side walls 71 flare outwardly to define weld flanges 72 that abut against the opposing face of the outer channel top wall 65 and are welded along their length such that the nested inner channel 66 and outer channel 65 define a rigid, tubular structure.

The inner side walls 71 have a shorter vertical height than the outer channel walls 68 such that the bottom wall 70 of the inner channel 66 is offset upwardly. Therefore, while the outer channel walls 68 define a thicker outside vertical thickness for the movable rails 22, the thinner inner channel 66 defines a thinner interior vertical thickness.

To support the movable rail 22 on the rollers 35, the bottom wall 70 has continuous strips of material at the corners 73 which strips are formed with the side walls 72 and are vertically supported on the rollers 35 as seen in FIG. 5. While the inner channel 66 has a reduced vertical dimension, the outer channel 65 has a greater vertical dimension to increase the overall rigidity and strength of the movable rail 22.

The inner channel 66 further includes a row of tooth formations, and preferably gear slots 75 which are spaced apart along the length of the channel 66 and define the teeth of a gear rack with which the drive gears 45 are drivingly engaged. The slots 75 open downwardly and while the slots 75 could be formed so as to project only partially through the thickness of the channel wall 75, the slots 75 preferably extend through the entire wall thickness as will be described in further detail herein.

The slots 75 extend laterally across only a partial width of the channel wall 70 so that the corner areas 73 remain strong. The teeth of the gears 45 project upwardly and engage the slots 75 such that rotation of the gears 45 drives the rails or rams 22 outwardly or inwardly relative to the main trailer body 12.

Formation of the slots 75 is accomplished by punching the U-shaped channel, preferably in a single punching operation. Formation of these slots 75 is improved over formation of slots in square tubing such that the two-part construction of the rail 22 provides advantages in manufacturing.

As an additional advantage, the rails 21 and 22 may be designed for lower load applications which allows for a reduction in the size of the channels 65 and 66 due to the reduced strength requirements. However, for higher load applications, the rails 21 and 22 may be modified to accommodate such loads. In particular, the load capacity may be increased by making the outer channel 65 larger. The inner channel 66, however, may use the same construction and be welded in place to still define a tubular structure which is usable with the same drive components.

To secure the movable rails 22 to the sideout 15, a bracket arrangement is provided to attach the opposite ends of the rails 22 to the sideout 15. In this regard, each end of the inner channel 66 includes a fastener block 80 fixed therein.

The outboard ends of the rails 22 include outboard brackets 81 which have a mounting slot 82 formed therein, through which a fastener 83 is fixed to the respective block 80. The slots 82 are vertically elongate to allow for adjustment of the vertical height of the bracket 81 relative to the rail 22 and once adjusted, the fastener 83 is tightened to fix the bracket 81 in position.

The inboard ends of the rails 22 similarly include inboard brackets 85 which include mounting slots 86 formed the same as slots 82. Fasteners 87 are provided to fix the inboard brackets 85 in place on the respective blocks 80 in a vertically adjustable position. Also, the top leg of each bracket 85 has a pair of mounting slots 88 through which fasteners are engaged with the sideout 15.

With this arrangement, a low profile arrangement is provided which has a lower space requirement for engagement with the drive gears 45 while still providing the strength of a thicker arrangement due to the outer channels 65.

Although a particular embodiment of the invention has been disclosed in detail for illustrative purposes, it will be recognized that variations or modifications of the disclosed apparatus, including the rearrangement of parts, lie within the scope of the present invention.

What is claimed is:

1. A telescoping drive mechanism for an extendible living section of a recreational vehicle, said drive mechanism having at least one telescoping rail assembly comprising:
    a gear drive comprising a rotatable drive gear and a motor which selectively rotates said drive gear to extend and retract the living section;
    a stationary rail having a mounting arrangement which is engagable with said recreational vehicle, said stationary rail having an interior channel wherein said drive gear projects therein; and
    a movable rail which is slidably supported within said interior channel in telescoping engagement with said stationary rail, said movable rail comprising an outer channel which has a first thickness and defines an interior slot, and an inner channel which is nested within said interior slot and affixed to said outer channel, said inner channel having a second thickness which is less than said first thickness and having an inner wall which is spaced from an opposing outer wall on said outer channel and at least partially closes said interior slot such that said inner and outer channels have a rigid tubular structure, said inner wall including gear tooth formations along the length thereof to define a gear rack which is drivingly engaged by said drive gear.

2. The drive mechanism according to claim 1, wherein said tooth formations are punched slots disposed in spaced relation along said inner wall.

3. The drive mechanism according to claim 2, wherein said inner channel has a U-shape defined by said inner wall and side walls, said side walls including mounting flanges which project sidewardly and are affixed to said outer wall of said outer channel.

4. The drive mechanism according to claim 3, wherein said U-shape of said inner channel defines a slot which opens upwardly, wherein said slot of said outer channel opens downwardly.

5. The drive mechanism according to claim 1, wherein said stationary rail includes rollers which support said inner wall.

6. The drive mechanism according to claim 5, wherein said tooth formations are slots disposed in spaced relation along said inner wall, said rollers rolling over said slots during relative movement between said stationary and movable rails.

7. The drive mechanism according to claim 5, wherein said outer channel has outer side walls which project vertically beyond said inner wall and are disposed on opposite sides of said rollers.

8. The drive mechanism according to claim 1, wherein said drive gear is rotatably supported on said stationary rail.

9. A telescoping drive mechanism for an extendible living section of a recreational vehicle, said drive mechanism having at least one telescoping rail assembly comprising:
    a gear drive comprising a rotatable drive gear and a motor which selectively rotates said drive gear to extend and retract the living section;
    a stationary rail having a mounting arrangement which is engagable with said recreational vehicle, said stationary rail having an interior guide slot wherein said drive gear projects therein and including support members within said guide slot; and
    a movable rail which is slidably supported within said guide slot on said support members in telescoping engagement with said stationary rail, said movable rail comprising an outer channel which defines an interior slot, and an inner channel which is nested within said interior slot and affixed to said outer channel, said inner channel having an inner wall which is spaced from an opposing outer wall on said outer channel and at least partially closes said interior slot such that said inner and outer channels define a rigid tubular structure, said inner wall having a downward facing wall surface which is in contacting relation with said support members so as to be movable therealong and includes gear teeth opening downwardly from said wall surface to define a gear rack which is drivingly engaged by said drive gear.

10. The drive mechanism according to claim 9, wherein said gear teeth are define by longitudinally spaced apart openings punched through said inner wall.

11. The drive mechanism according to claim 10, wherein said openings are defined laterally between edge portions of said inner wall which extend continuously along the length of said inner channel wherein said movable rail is supported by said support members at least by said edge portions.

12. The drive mechanism according to claim 11, wherein said support members are rollers, and said drive gear is rotatably supported on said stationary rail.

13. The drive mechanism according to claim 9, wherein said stationary rail has downwardly projecting rail side walls which support said support members thereon, said support members having opposite ends which are spaced laterally from said rail side walls to define clearance spaces, said outer channel including channel side walls which project downwardly below said wall surface of said inner channel and are disposed within said clearance spaces.

14. The drive mechanism according to claim 9, wherein said support members are rollers, and said drive gear is rotatably supported on said stationary channel.

15. The drive mechanism according to claim 14, wherein gear teeth of said drive gear project vertically above said rollers.

* * * * *